United States Patent Office 2,803,167
Patented Aug. 20, 1957

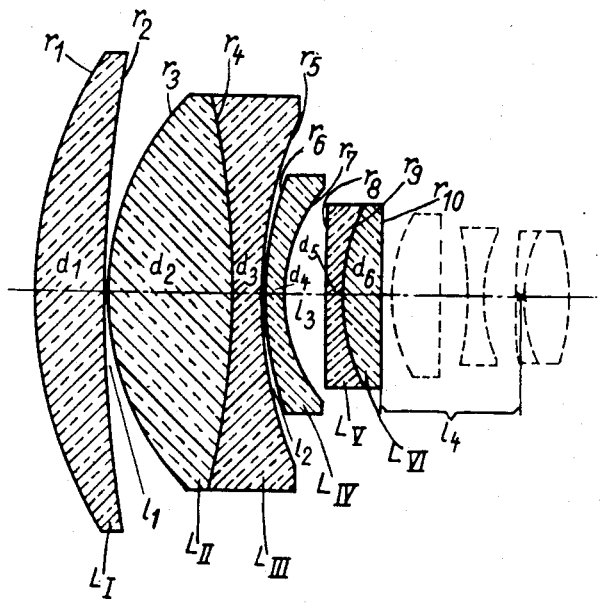

2,803,167

AFOCAL LENS SYSTEM ATTACHMENT FOR PHOTOGRAPHIC OBJECTIVES

Horst Köhler, Heidenheim (Brenz), Robert Richter, Aalen, and Helmut Kaselitz, Konigsbronn, Germany, assignors to Carl Zeiss, Heidenheim (Brenz), Württemberg, Germany Application October 3, 1955, Serial No. 538,217

Claims priority, application Germany October 2, 1954

3 Claims. (Cl. 88—57)

Object of the invention is an afocal lens system for photographic objectives with a telescope magnification which, reckoned in the direction of the light, is greater than 1. Such attachment systems serve to lengthen the focal length of existing photographic objectives in proportion to the telescope magnification. Prior attachments of this kind do not satisfy the requirements made today of photographic optical systems, at telescope magnifications of about 1.7 and at angles of field of approximately 70°. This disadvantage is eliminated by the present invention.

The present invention concerns an improvement of such afocal attachment systems which consist of a collective front and a dispersive rear lens group. The invention consists in constituting both the front and the rear lens group of two components separated from each other by an air space and in giving to both components of the collective front lens group and to the first component of the dispersive rear lens group meniscus shape with their convex sides towards the object and in the collective rear lens group containing at least one dispersive lens whose refractive index is greater than 1.67 and whose Abbe number is greater than 44.

For the explanation of the effect of the invention one may imagine a schematic attachment system consisting of a group of lenses of collective power assumed to be infinitely thin, and of a second lens group of dispersive power also assumed to be infinitely thin. Let the separation between both lens groups be equal to the difference between the absolute amounts of the focal lengths as known in the Galilean telescope. Both lens groups are to consist of one infinitely thin collective lens and dispersive lens each. If one postulates that both the longitudinal chromatic aberration and also the chromatic difference of magnification of this attachment shall be corrected, this entails according to well-known laws of geometrical optics that each lens group in itself must be achromatized. If it is further presupposed that the Petzval sum for the system shall vanish, then the following relations result from the conditions of achromatism of each part of the system and from the Petzval condition.

Let there be designated by $\varphi_1 \ldots \varphi_4$ = the refractive powers of the lenses;
$\nu_1 \ldots \nu_4$ = the corresponding Abbe numbers;
$n_1 \ldots n_4$ = the corresponding refractive indices;
$\phi_1$ = the refractive power of the front lens group;
$\phi_2$ = the refractive power of the rear (dispersive) lens group.

Then the condition of achromatism results in the following conditions between the refractive powers of the single lenses:

$$\varphi_1 = \frac{\nu_1}{\nu_1 - \nu_2} \cdot \phi_1 \qquad (1)$$

$$\varphi_2 = \frac{-\nu_2}{\nu_1 - \nu_2} \cdot \phi_1$$

$$\varphi_3 = \frac{\nu_3}{\nu_3 - \nu_4} \cdot \phi_2$$

$$\varphi_4 = \frac{-\nu_4}{\nu_3 - \nu_4} \cdot \phi_2$$

The observance of the required telescope magnification $\Gamma$ results in the relation $$\phi_2 = -\Gamma \phi_1 \qquad (2)$$

The Petzval sum of the individual lens groups is now $$P_1 = \frac{\varphi_1}{n_1} + \frac{\varphi_2}{n_2} = \phi_1 \frac{1}{\nu_1 - \nu_2}\left(\frac{\nu_1}{n_1} - \frac{\nu_2}{n_2}\right) \qquad (3a)$$

and $$P_2 = \frac{\varphi_3}{n_3} + \frac{\varphi_4}{n_4} = \phi_2 \cdot \frac{1}{\nu_3 - \nu_4}\left(\frac{\nu_3}{n_3} - \frac{\nu_4}{n_4}\right) = -\Gamma \cdot \phi_1 \cdot \frac{1}{\nu_3 - \nu_4}\left(\frac{\nu_3}{n_3} - \frac{\nu_4}{n_4}\right) \qquad (3b)$$

If the Petzval sum of the system is to be made zero, then $P_1 + P_2$ must equal zero or the following equation must be fulfilled:

$$\frac{1}{\nu_1 - \nu_2}\left(\frac{\nu_1}{n_1} - \frac{\nu_2}{n_2}\right) = \Gamma \cdot \frac{1}{\nu_3 - \nu_4}\left(\frac{\nu_3}{n_3} - \frac{\nu_4}{n_4}\right) \qquad (4)$$

An analytical investigation shows that the value of the function of the form $$\frac{1}{\nu_1 - \nu_2}\left(\frac{\nu_1}{n_1} - \frac{\nu_2}{n_2}\right) \qquad (5)$$

is essentially determined by the section length of the straight line joining the two points of the pair of glasses with the ordinate axis in the $n-\nu$—diagram. If we select e. g. for the first lens group a standard glass pair, a numerical evaluation shows that the term (5) comes to a numerical value of about 0.6. For a telescopic magnification of $\Gamma = 1.75$ it is then required that the term $$\frac{1}{\nu_3 - \nu_4}\left(\frac{\nu_3}{n_3} - \frac{\nu_4}{n_4}\right) \qquad (6)$$

should attain a numerical value of approximately 0.34. This can be achieved with a pair of glasses for which the straight line joining the points in the $n-\nu$—diagram has a considerably steeper slope than the standard glass pair, and consequently a smaller section length of the ordinate. This slope is obtained according to the invention by selecting for the dispersive lens a glass whose $n_d$ is larger than 1.67 and whose $\nu$ is larger than 44. To keep the other aberrations of definition small it is necessary according to the invention to give the first three members meniscus shape and to bend them so that their external surfaces are approximately concentric with the principal ray.

Since the above considerations are valid only for systems of infinitely thin lenses within the range of the Seidel theory, and since a system practicable for a large image field must have considerable finite lens thickness, and furthermore since for a large inclination of the principal ray the higher order aberrations must play an important part, the relation (4) can merely point the way for choosing the glasses. The glass types ultimately found for the fine correction need therefore not fulfill exactly the conditions of relation (4).

In view of the required large angle of field it is advisable to combine the groups of lenses from more than the original two lenses. According to the invention therefore the collective lens in the first lens group and the dispersive lens in the second lens group is split in two so that the first component of each lens group is a free-standing lens and the second component of each lens group represents a component cemented from two lenses of opposite refractive powers.

In an endeavour to obtain a low value for the expression (6) according to the above theoretical explanations, in developing the invention the refractive index difference at the cemented surface in the rear lens group is made greater than 0.15. A further advantageous embodiment of the invention results from the difference of the refractive indices of the two lenses cemented together in the front lens group being smaller than 0.01. Both these measures result in the advantage that the cemented surface in the front lens group can be used predominantly for the chromatic correction and the cemented surface of the rear lens group predominantly for the correction of the aberrations of definition.

It is further proposed for the correction of the aberrations of definition and of distortion according to the invention to keep within the following values for the anterior radii of the individual componets:

First lens of the front lens group:
  greater than 0.7 times but smaller than the unit value of the focal length of the front lens group;
Second component of the front lens group:
  greater than 0.4 times but smaller than 0.8 times the focal length of the front lens group;
First lens of the rear lens group:
  greater than 0.8 times but smaller than 1.2 times the focal length of the rear lens group;
Second component of the rear lens group:
  greater than 10 times the focal length of the rear lens group.

A further advantageous embodiment results from having the radius of the cemented surface in the front lens group larger than 1.3 times and smaller than twice the focal length of the front lens group and having its convex side turned towards the image, and by furthermore having the radius of the cemented surface of the rear lens group greater than 0.3 times and smaller than the unit value of the focal length of the rear lens group, and by having its convex side turned towards the object.

Similarly it is an advantage according to a further thought of the invention, to have the individual focal lengths of the single components in the two lens groups differ by a maximum factor of 1.8 each.

In the following Figure of the illustration an afocal attachment lens system according to the invention is represented in section. In the table given below the numerical values for one embodiment of such a system are listed.

In the illustrations and in the table there are designated

By $r$ the radii of the surfaces,
By $d$ the thickness of the individual lenses,
By $l$ the air spaces between the individual members.

The values listed refer to a focal length $f'=1$ of the anterior lens group. The telescope magnification amounts to 1.7.

The individual focal length of the collective front lens group in the embodiment shown amounts to $f'=51.07$ mm., the individual focal length of the rear dispersive lens group amounts to $f''=29.99$ mm. The photographic objective placed behind the attachment lens system according to the invention and shown in dotted lines in the illustration is an objective of a focal length of 45 mm.

Embodiment

| Lenses | Radii | Thicknesses and Separations | $n_d$ | d |
|---|---|---|---|---|
| $L_I$ | $r_1=+0.874643$ | $d_1=0.13902$ | 1.51821 | 65.2 |
|  | $r_2=+2.765812$ | $l_1=0.00196$ |  |  |
|  | $r_3=+0.551870$ | $d_2=0.24182$ | 1.61272 | 58.6 |
| $L_{II}$ | $r_4=-1.671412$ |  |  |  |
| $L_{III}$ |  | $d_3=0.05365$ | 1.60565 | 37.9 |
|  | $r_5=+0.874643$ |  |  |  |
|  | $r_6=+0.655904$ | $l_2=0.00196$ |  |  |
| $L_{IV}$ |  | $d_4=0.04406$ | 1.69072 | 54.8 |
|  | $r_7=+0.328725$ |  |  |  |
|  |  | $l_3=0.08028$ |  |  |
|  | $r_8=+15.331506$ | $d_5=0.03427$ | 1.72033 | 50.3 |
| $L_V$ |  |  |  |  |
| $L_{VI}$ | $r_9=+0.366184$ | $d_6=0.07441$ | 1.51118 | 50.9 |
|  | $r_{10}=+3.906990$ |  |  |  |

$l_4$ designates the distance of the exit pupil of the attachment system from the last lens apex. This exit pupil must coincide with the entrance pupil of the photographic system placed behind it.

We claim:

1. An afocal lens system for attaching to photographic objectives, with telescope magnification (reckoned in the direction of light) greater than unity, comprising a collective front and a dispersive rear lens group, both groups consisting each of two components separated by air spaces and both components of said collective front lens group as well as the first component of the said dispersive rear lens group having meniscus shape turning their convex sides towards the object, the first components in said lens groups being each an uncemented lens and the second components in said lens groups consisting each of two cemented lenses of opposite refractive power, the front radii of the individual lens components having the following values: first lens of the front lens group greater than 0.7 but smaller than 1.0 times the individual focal length of the said front lens group; second lens of the front lens group greater than 0.4 but smaller than 0.8 times the individual focal length of said front lens group; first lens of the rear lens group greater than 0.8 but smaller than 1.2 times the individual focal length of the said rear lens group; second lens of the rear lens group greater than 10.0 times the individual focal length of the said rear lens group; the cemented surface in the second component of the said front lens group turning its convex side towards the image and having its radius greater than 1.3 but smaller than 2.0 times the individual focal length of the said front lens group, and the cemented surface in the second component of the said rear lens group turning its convex side towards the object and having a radius greater than 0.3 but smaller than 1.0 times the individual focal length of the said rear lens group; and the said second component in the dispersive rear lens group containing a dispersive lens having a refractive index greater than 1.67 and an dispersive Abbe number greater than 44.

2. An afocal lens system for attaching to photographic objectives according to claim 1, the difference in the refractive indices of the two lenses cemented to each other in the front lens group being smaller than 0.01, the difference in the refractive indices of the two lenses cemented to each other in the rear lens group being greater than 0.15, the individual focal lengths of the single components in the said two lens groups differing by a maximum factor of 1.8.

3. An afocal lens system for attaching to photographic objectives according to claim 1, the individual surface refracting powers ($\Delta n/r$) differing by a maximum of $\pm 0.5/f$ and the thicknesses ($d$) and the air spaces $l_1$ and $l_3$ by a maximum of $\pm 0.05 \cdot f$ where $f$ refers to the individual focal lengths of each lens group containing the surfaces concerned) from the values listed in the following numerical example:

| Lenses | Radii | Thicknesses and Separations | $n_d$ | $\nu_d$ | $\Delta n/r$ |
|---|---|---|---|---|---|
| $L_I$ | $r_1 = +0.874643 \cdot f$ | $d_1 = 0.13902 \cdot f$ | 1.51821 | 65.2 | $+0.5924817/f$ |
|  | $r_2 = +2.765812 \cdot f$ | $l_1 = 0.00196 \cdot f$ |  |  | $-0.1870011/f$ |
| $L_{II}$ | $r_3 = +0.551870 \cdot f$ | $d_2 = 0.24182 \cdot f$ | 1.61272 | 58.6 | $+1.1102614/f$ |
| $L_{III}$ | $r_4 = -1.671412 \cdot f$ | $d_3 = 0.05365 \cdot f$ | 1.60565 | 37.9 | $+0.0042299/f$ |
|  | $r_5 = +0.874643 \cdot f$ | $l_2 = 0.00196 \cdot f$ |  |  | $-0.6924539/f$ |
| $L_{IV}$ | $r_6 = +0.655904 \cdot f$ | $d_4 = 0.04406 \cdot f$ | 1.69072 | 54.8 | $+1.0530809/f$ |
|  | $r_7 = +0.328725 \cdot f$ | $l_3 = 0.08028 \cdot f$ |  |  | $-2.1012092/f$ |
| $L_V$ | $r_8 = +15.331506 \cdot f$ | $d_5 = 0.03427 \cdot f$ | 1.72033 | 50.3 | $+0.0469836/f$ |
| $L_{VI}$ | $r_9 = +0.366184 \cdot f$ | $d_6 = 0.07441 \cdot f$ | 1.51118 | 50.9 | $-0.5711609/f$ |
|  | $r_{10} = +3.906990 \cdot f$ |  |  |  | $-0.1308372/f$ |

$L_I$–$L_{VI}$ being the individual lens elements,
$r_1$–$r_{10}$ being the radii of the lens surfaces,
$d_1$–$d_6$ being the lens thicknesses,
$l_1$–$l_3$ being the air separations,
$n_d$ being the refractive indices,
$\nu_d$ being the Abbe numbers
$\Delta n/r$ being the refractive powers of the lens surfaces.

References Cited in the file of this patent

UNITED STATES PATENTS

| 756,779 | Dallmeyer | Apr. 5, 1904 |
| 1,651,493 | Warmisham | Dec. 6, 1927 |
| 2,169,130 | Tronnier et al. | Aug. 8, 1939 |
| 2,184,018 | Ort | Dec. 19, 1939 |

FOREIGN PATENTS

| 722,817 | France | Jan. 5, 1932 |
| 604,490 | Germany | Oct. 22, 1934 |